UNITED STATES PATENT OFFICE.

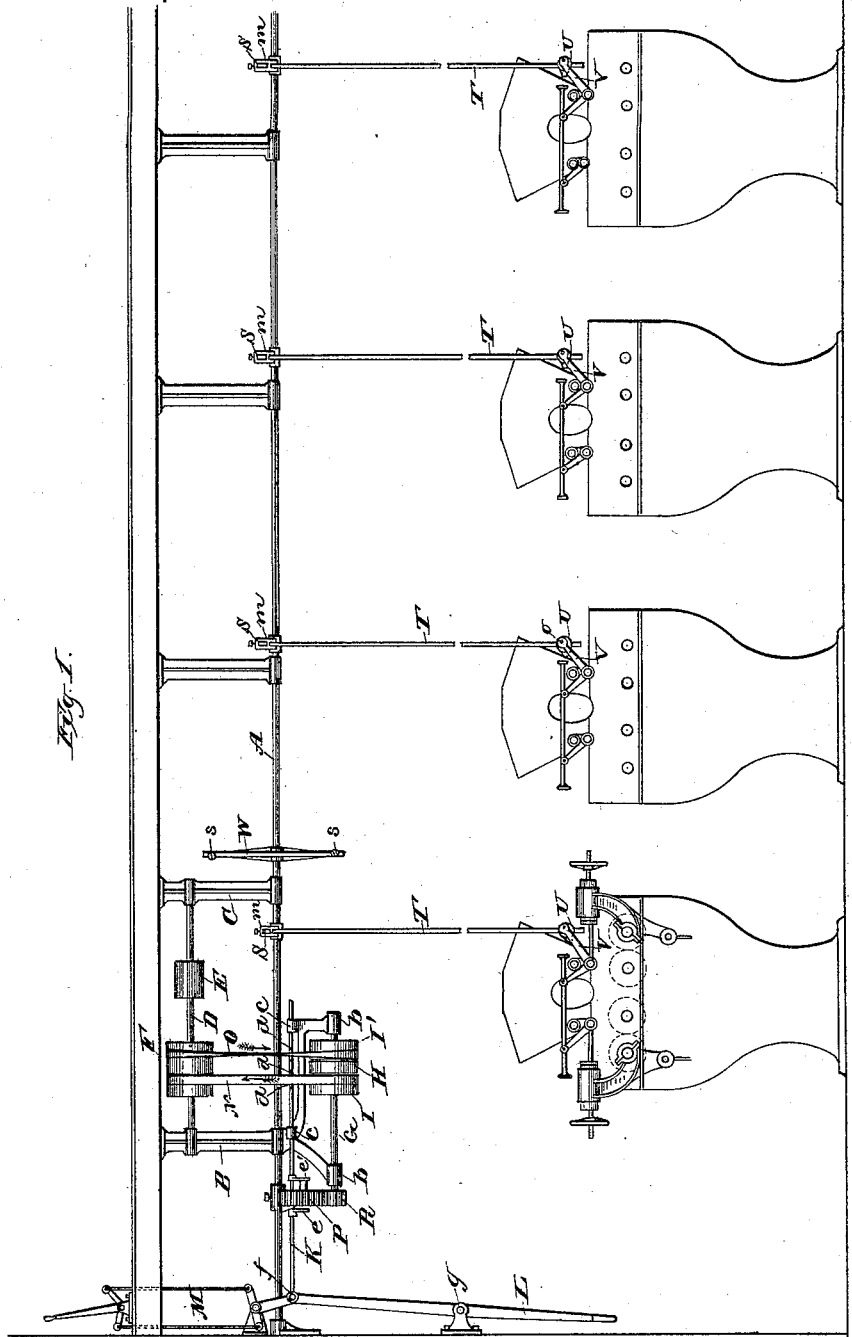

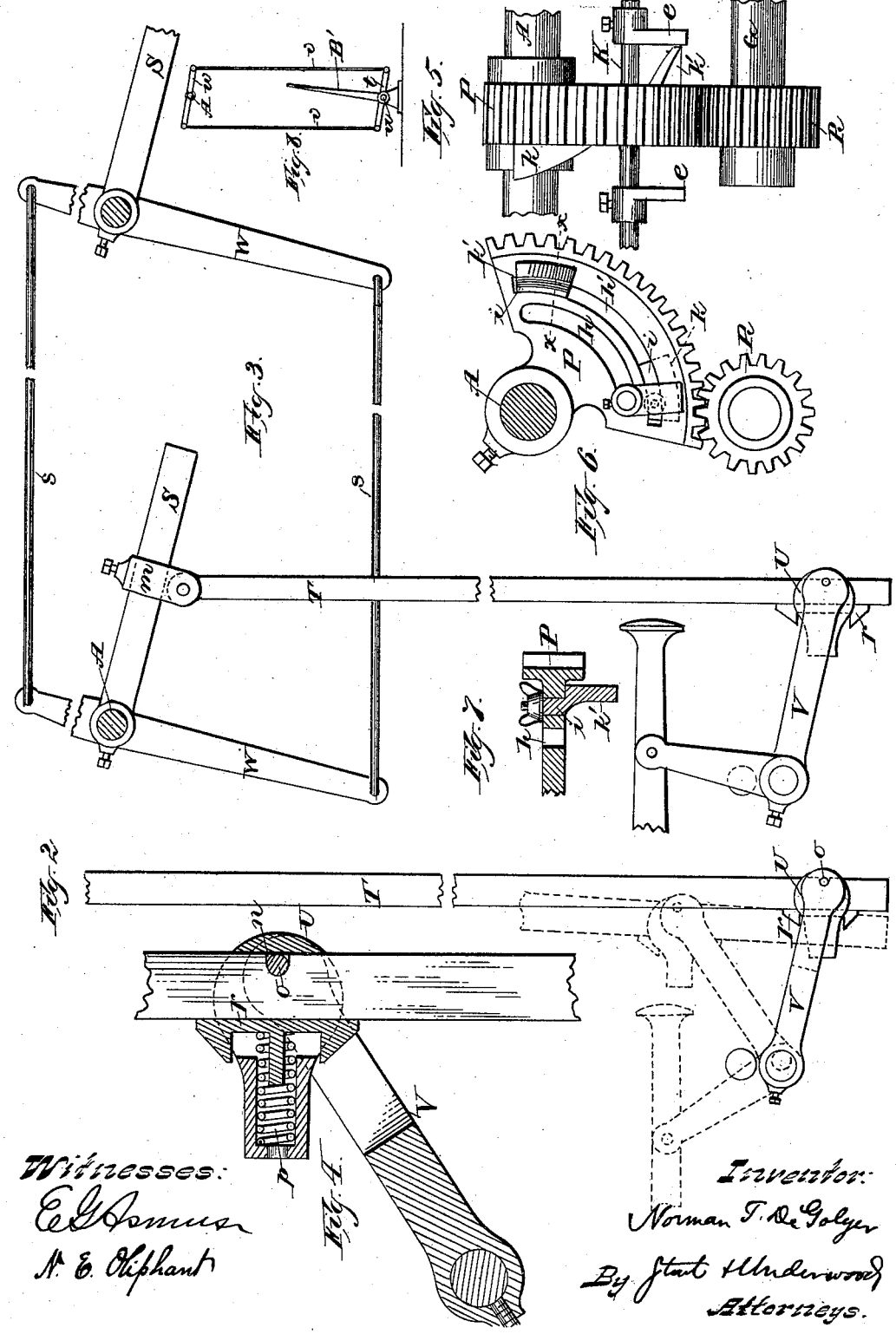

NORMAN T. DE GOLYER, OF MILWAUKEE, WISCONSIN.

SHIFTING DEVICE FOR MILLS.

SPECIFICATION forming part of Letters Patent No. 343,442, dated June 8, 1886.

Application filed December 2, 1885. Serial No. 184,423. (No model.)

*To all whom it may concern:*

Be it known that I, NORMAN T. DE GOLYER, of Milwaukee, in the county of Milwaukee, and in the State of Wisconsin, have invented certain new and useful Improvements in Shifting Devices for Mills, &c.; and I do hereby declare that the following is a full, clear, and exact description thereof.

My invention relates to shifting devices for mills, &c.; and it consists in a mechanism whereby a series of machines may be simultaneously thrown in or out of operative adjustment, and at the same time permit of any of the several machines being disconnected without affecting the others in the series, as will be hereinafter more fully described with reference to the accompanying drawings, in which—

Figure 1 represents a side elevation showing one form of my invention applied to a series of mills, the latter being so turned as to bring their immediate adjusting mechanism to the front for the purpose of better illustration; Fig. 2, an enlarged side elevation showing the manner of connecting the immediate adjusting mechanism of a mill with a depending rod designed to have a lever-connection with a main shaft; Fig. 3, a similar view showing also a means for connecting a system of shafting; Fig. 4, a detail view showing the means for connecting a depending rod with the adjusting mechanism attached to a mill; Figs. 5 and 6, detail views of the belt-shifting mechanism; Fig. 7, a section on line *x x*, Fig. 6; Fig. 8, a view showing another form of lever system for operating the main shaft.

A represents a main shaft suspended in suitable hangers, two of said hangers, B C, being provided with bearings *a* for a shaft, D, having secured thereto a main driving-pulley, E, and a broad-face pulley, F. The hanger B, at its lower end, is bifurcated and provided with bearings *b* for a shaft, G, the latter carrying a tight single-face pulley, H, and loose double-faced pulleys I I'. The bifurcated end of this hanger B is also provided with eyes *c* for a sliding rod, K, said rod having a series of projecting pins or belt-guides, *d*, and tappets *e e'*. The sliding rod K is connected at *f* to a depending lever, L, fulcrumed at *g*, and, in addition thereto, connection may be also established between said rods and a lever mechanism, M, to be operated from above, either or both these connections being employed or variously modified, as found necessary or convenient.

N O are belts designed to transmit motion from the pulley F to those H I I', the belt O being crossed, so as to give a reverse movement from that imparted by the one N.

To the main shaft A is secured a toothed segment, P, designed to engage a pinion, R, on one end of the shaft G, said segment having slots *h h'*, in which are adjustably secured the shanks *i* of cams *k k'*, designed to come in contact with the tappets *e e'* on the shaft K, said cams projecting on opposite sides of the segment.

At suitable intervals along the shaft A are adjustably secured arms S, designed to receive clamps *m*, the latter being pivotally connected to depending rods T, said clamps being also capable of adjustment with relation to their supporting-arms. Each of these depending rods T, near its lower end, is provided with a recess, *n*, adapted to engage a pin, *o*, which passes through an elongated hollow casting, U, slotted to receive said rod, and also through the bifurcated end of a lever-arm, V, secured to mechanism immediately connected to the machine, for throwing the same in and out of operative adjustment. The casting U has inserted in its elongated portion a spring, *p*, which impinges against a gib, *r*, to thus retain the rod T in operative engagement with the pin *o*.

In order to connect the shaft A with a parallel shaft, A', designed to be also provided with a series of arms, S, each connecting with a machine after the manner above described, I centrally secure to each of said shafts a lever, W, and unite the respective ends of these levers by rods *s*. By this simple means an unlimited number of shafts may be united and the several machines relatively connected thereto can be thrown in or out of operative adjustment at one time by the actuation of the belt-shifting lever system.

In the operation of my invention, supposing the machines to be in operative adjustment, the belts N O will be running on the loose pulleys I I' in opposite directions, as indicated by arrows in Fig. 1. The lever L being pushed from the operator, will slide the rod K in an opposite direction, and by means of the pins $d$ shift the belt N over upon the single-face tight pulley H, and at the same time force the belt O farther over on the double-faced loose pulley I', thereby causing the shaft G to revolve and its pinion R to actuate the toothed segment P. This actuation of the segment causes a partial revolution of the shaft A, thereby causing the arms S, secured thereto, to rise, and in so doing, by their connections through the medium of the clamps $m$, the depending rods T, and lever-arms V will operate the mechanism immediately connected to the machines and throw the same out of operative adjustment. By the time this operation is effected the cam $k$ of the segment P will have come in contact with the tappet $e$ on the sliding rod or belt-shifter K and automatically shift the belts N O back to their original positions upon the loose pulleys I I'.

To throw the machines into operative adjustment, the lever L is drawn toward the operator, thereby causing the rod or shifter K to carry the belt O onto tight pulley H and the belt N farther over upon its loose pulley in a direction toward said lever. This operation brings the pinion R and segment P again into operation, but reverse from that above described, and causes the arms S to be depressed, and by their connections force the controlling mechanism on the machines to bring the operative parts into adjustment. This operation being completed, the cam $k'$ on the segment comes into contact with the tappet $e'$ on the sliding rod K and automatically shifts the belts to their normal position, as shown in Fig. 1. By having the cams $k\,k'$ adjustable with relation to the segment P the throw of the latter may be regulated, as occasion may require.

By the mechanism above described any number of mills or other machines may be thrown in or out of operative adjustment at one point and time, it being only necessary to have connection established between the several shafts carrying the arms S, and this can be readily effected by the simple system consisting of the levers W and rods $s$, as set forth in the foregoing.

Should it be necessary or desirable to disconnect a machine without disturbing the others in the series, this operation can be readily effected by forcing back the gib $r$ in the slotted casting U, thereby permitting the depending rod T to be disengaged from the pin $o$, connecting said casting and the bifurcated lever-arm V of the adjusting mechanism immediately connected to the machine.

In Fig. 8 I show a lever system which consists of an arm, $t$, fulcrumed at $u$, and provided with a vertical hand-bar, B'. Secured to the ends of the arm $t$ are rods $v$, which connect with the extremities of an arm, $w$, fast upon the main shaft A. By this lever system the main shaft and its connections may be operated to simultaneously throw a series of mills or other machines in or out of operative adjustment.

Having thus fully described my invention, what I claim as new, and desire to secure by Letters Patent, is—

1. A shifting mechanism for mills or other machines, consisting of a main shaft provided at suitable intervals with lever systems designed to connect with the immediate adjusting mechanism of said machines, and a lever system for operating the main shaft, whereby the several machines may be simultaneously thrown in or out of operative adjustment, substantially as set forth.

2. A shifting mechanism for mills or other machines, consisting of the lever system adapted to connect each of the several machines with one common shaft, a belt-and-pulley system designed to be operatively connected to the common shaft, and a belt-shifter operated by a suitable lever, whereby the several machines may be simultaneously thrown in or out of operative adjustment, as set forth.

3. A shifting mechanism consisting of a suitably-hung main shaft having secured thereto at suitable intervals a lever system designed to connect with the adjusting mechanism immediately attached to a machine, a belt-and-pulley mechanism operatively connected to the main shaft by a pinion and tooth segment, the latter provided with cams, a sliding rod carrying tappets and projecting pins or belt-guides, and a suitable lever designed to operate said sliding rod, as set forth.

4. In a shifting mechanism for mills or other machines, a lever-arm designed to have one end connected to the immediate adjusting mechanism of a machine, and its other end pivotally united with an elongated slotted hollow casting provided with an internal spring and a gib, in combination with a lever system designed to engage a shaft, a belt-pulley and segment-gear mechanism for operating said shaft, and a belt-shifting apparatus for throwing said latter mechanism in or out of action, substantially as set forth.

5. In a shifting apparatus for mills or other machines, a main shafting having secured thereto a series of arms provided with adjustable clamps, and depending rods pivotally connected to said clamps, in combination with elongated hollow slotted castings, each provided with a gib and spring, and levers-arms having their lower ends connected to the adjusting mechanism immediately attached to a series of machines, and their upper ends bifurcated to receive the castings and engage recesses in the depending rods near their lower ends, substantially as and for the purpose set forth.

6. In a shifting mechanism for mills or other machines, a toothed segment secured to a main shaft and provided with adjustable cams projecting on opposite sides, in combination with a pinion of a shaft that carries suitable tight and loose belt-pulleys, a sliding rod operated by a lever and provided with belt-guides and tappets, and a shaft carrying a main driving-pulley and a tight pulley having a belt connection with the pulleys on the pinion-shaft, substantially as and for the purpose set forth.

7. In a shifting mechanism for mills or other machines, a main shaft-hanger having a bifurcated end provided with bearings for a pinion-shaft, and eyes for a sliding rod, a tight single-face pulley interposed between two double-face loose pulleys on the pinion-shaft, a broad-face tight pulley on a shaft revolving in bearings above the main shaft, and a straight belt and cross-belt adapted to operate upon the several pulleys, substantially as and for the purpose described.

8. In a shifting mechanism for mills or other machines, a means for uniting two or more shafts carrying lever systems designed to connect with the adjusting apparatus of a series of machines, and which consists of lever-arms centrally secured to the respective shafts and united at their ends by suitable rods, substantially as and for the purpose set forth.

9. In a shifting mechanism for mills or other machines, the main shaft A, provided with a slotted and toothed segment, P, and at suitable intervals with arms S, clamps $m$, adjustable on said arms, a depending rod, T, pivotally connected to each clamp and provided with a recess, $n$, near its lower end, an elongated hollow slotted casting, U, provided with an internal spring, $p$, and gib $r$, and a bifurcated lever-arm, V, connecting said rod and casting with the adjusting apparatus of a machine, in combination with a shaft, G, carrying a single-face tight pulley, H, double-face loose pulleys I I', and a pinion, R, a shaft, D, carrying pulleys E F, a straight belt, N, and cross-belt O, designed to operate upon the pulleys F, H, I, and I', sliding rod K, provided with pins or belt-guides $d$ and tappets $e\ e'$, cams $k\ k'$, adjustable in the slots of the segment P, and a suitable lever connected to the said sliding rod, all arranged to operate substantially as and for the purpose set forth.

10. A shifting device for mills or other machines, consisting of a mechanism whereby a series of machines may be simultaneously thrown in or out of operative adjustment, substantially as set forth.

11. A shifting device for mills or other machines, consisting of a mechanism whereby a series of machines may be simultaneously thrown in and out of operative adjustment, and at the same time permit of any of the several machines being disconnected without affecting the others in the series, substantially as set forth.

In testimony that I claim the foregoing I have hereunto set my hand, at Milwaukee, in the county of Milwaukee and State of Wisconsin, in the presence of two witnesses.

NORMAN T. DE GOLYER.

Witnesses:
STANLEY S. STOUT,
H. G. UNDERWOOD.